June 11, 1957     R. C. RUSSELL     2,795,153
DUAL TURBINE TORQUE CONVERTER

Filed Aug. 27, 1953     2 Sheets-Sheet 1

INVENTOR.
ROBERT C. RUSSELL
BY
ATTORNEYS

INVENTOR.
ROBERT C. RUSSELL

United States Patent Office 2,795,153
Patented June 11, 1957

2,795,153

DUAL TURBINE TORQUE CONVERTER

Robert C. Russell, South Euclid, Ohio, assignor to Eaton Manufacturing Company, Cleveland, Ohio, a corporation of Ohio Application August 27, 1953, Serial No. 376,806

9 Claims. (Cl. 74—677)

This invention relates to power transmission mechanisms and, more particularly, to an improved construction for a transmission of the hydraulic torque converter type.

An object of the present invention is to provide an improved transmission of this type in which the bladed annular members cooperating to define the toroidal fluid circuit characteristic of a device of this kind, include dual turbine members connected with the power output means such that a high torque amplification will be obtainable during the starting or stall condition of operation and over a wide range of speeds.

Another object is to provide such an improved transmission in which the dual turbine members deliver power to the output means through torque amplifying planetary gearing, of which the ring gear is connected with the primary or first turbine member and the sun gear is connected with the second turbine member.

Still another object is to provide an improved transmission of the kind above referred to in which the second turbine member is connected with the sun gear in a relatively fixed, forward driving relation thereto, and in which both the sun gear and the second turbine member are inhibited against reverse rotation.

Additionally, this invention provides an improved transmission of the character mentioned above in which the planetary gearing produces the desired high value of torque amplification during the starting or stall condition of operation while the second turbine member is being held against reverse rotation, and in which the torque amplification by the planetary gearing decreases as the speed of forward rotation of the second turbine member increases until a so-called "locked-up" condition is reached in which torque is transmitted to the output means from the first and second turbine members simultaneously and the effective transmission ratio is substantially a 1 to 1 ratio.

The invention can be further briefly summarized as consisting in certain novel combinations and arrangements of parts hereinafter described and particularly set out in the claims hereof.

In the accompanying sheets of drawings, forming a part of this specification:

Figure 1:
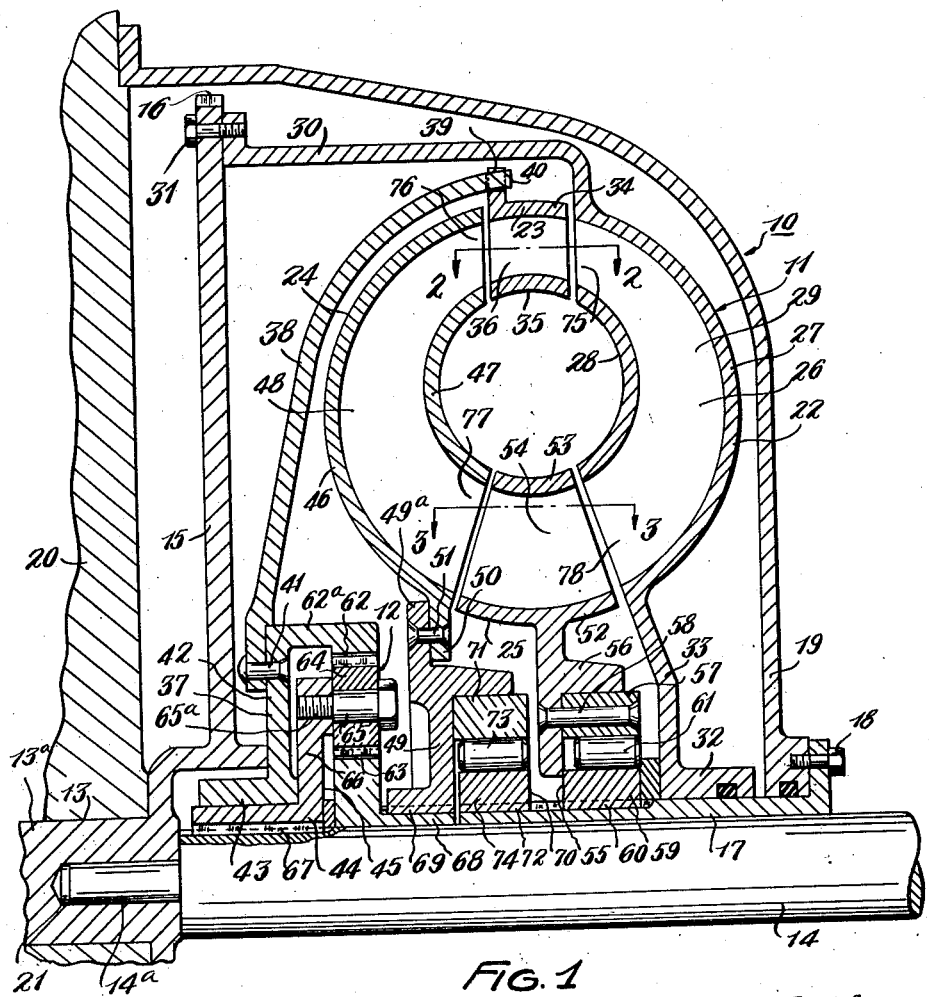
Fig. 1 is a partial vertical axial section taken through a transmission mechanism of the hydraulic torque converter type and embodying the present invention.

As representing one practical embodiment of this invention, Fig. 1 shows an improved transmission mechanism 10 which comprises, in general, a torque amplification device or converter 11 of the toroidal fluid circuit type, and mechanical torque amplification gearing 12 associated with such torque converter. The transmission mechanism 10 also comprises a rotatable power input member or shaft 13 and a rotatable power output member or shaft 14.

The input member 13 comprises a shaft portion $13^a$ of an engine crankshaft, or the like, and a disk or flywheel portion 15 connected with such shaft portion and provided around its outer periphery with gear teeth 16 adapted to be engaged by the driving pinion of a starting motor. The output shaft 14 is rotatably journalled in a fixed inner sleeve 17 and is disposed in substantially coaxial alignment with the shaft portion $13^a$ of the input member.

The inner sleeve 17 is supported and held in a fixed relation as by having its outer end secured by means of screws 18 to a stationary outer housing 19 in which the torque converter 11 is rotatable. The outer housing 19 is suitably connected with a stationary vehicle part, such as an engine portion 20 in which the input shaft portion $13^a$ is rotatably journalled. At its inner or forward end, the output shaft 14 is provided with a reduced portion or shaft extension $14^a$ which is journalled in a pilot bearing socket 21 of the input member 13.

The torque converter 11 comprises a group of relatively rotatable bladed annular members 22, 23, 24 and 25 in cooperating relation and defining a toroidal fluid path or circuit passage 26 interiorly of this device. The member 22 of this group is an annular pump member which, when driven as hereinafter described, propels the hydraulic fluid through the toroidal fluid circuit 26 in a velocity stream. The members 23 and 24 are annular turbine members which are acted upon by the stream of hydraulic fluid, and of which the member 23 comprises a first or primary turbine member and the member 24 comprises a secondary turbine member which is hereafter referred to merely as a second turbine member. The member 25 is an annular reaction member having a reaction function in the toroidal fluid circuit, as explained hereinafter.

The pump member 22 comprises curved outer and inner annular walls 27 and 28, and an annular group of spaced blades or vanes 29 extending between and connecting such outer and inner walls. The pump member also comprises an axially forwardly extending annular wall or web 30 which is connected with, or formed as a continuation of, the curved outer wall 27 and which has its forward end secured to the flywheel portion 15 as by means of the connecting screws 31. The pump member 22 also includes a hub portion 32 which is journalled on the fixed inner sleeve 17 and is connected with the curved outer wall 27 by means of a substantially radially extending annular wall or web 33.

The first turbine member 23 comprises a pair of outer and inner annular walls 34 and 35, and an annular group of spaced blades or vanes 36 extending between and connecting such outer and inner walls. This first turbine member is mounted for rotation about the axis of the output shaft 14 by being connected with a hub member 37 by means of a generally radially extending curved annular wall or web 38.

The connection between the turbine member 23 and the outer edge of the annular wall 38 is formed by a meshing engagement between an annular group of circumferentially spaced teeth or lugs 39 carried by this turbine member and an annular group of circumferentially spaced teeth or lugs 40 carried by the wall 38. The connection of the wall 38 with the hub member 37 is formed by rivets 41, or the like, extending through such wall and through a radially extending annular flange portion 42 of this hub member. The hub member 37 has an axial sleeve portion 43 which is rotatably journalled on the sleeve portion 44 of a carrier member 45 constituting a part of the torque amplification gearing 12.

The second turbine member 24 comprises a pair of outer and inner curved annular walls 46 and 47, and an annular group of spaced blades or vanes 48 extending between and connecting such outer and inner walls. This second turbine member 24 is supported for rotation about the axis of the output shaft 14 by a hub member 49 having a radial annular flange 49ª to which a radial annular flange portion 50 of the turbine member is secured by means of rivets 51.

The reaction member 25 comprises curved outer and inner annular walls 52 and 53, and an annular group of spaced blades or vanes 54 extending between and connecting such outer and inner walls. The reaction member 25 is mounted for rotation about the axis of the output shaft 14 by a one-way brake device 55 interposed between the fixed sleeve 17 and an annular rim portion 56 of an angular cross-sectional shape which is connected with the curved outer wall 52.

The one-way brake device 55 comprises an outer annular race or ring 57 which is secured to the rim portion 56 by means of the rivets 58, and an inner annular race or ring 59 mounted in fixed relation on the sleeve 17 by means of a keyed or splined connection indicated at 60. The one-way brake device 55 also comprises an annular group of rollers 61 disposed between the outer and inner races 57 and 59. The brake device 55 permits rotation of the reaction member 25 in a forward direction, but prevents rotation of this member in a reverse direction.

The torque amplification gearing 12 is here shown as being of the planetary type and comprises ring and sun gear members 62 and 63, and an annular group of planet pinion gears 64 disposed between and having meshing engagement with such ring and sun gears. The pinions 64 are supported by the carrier 45 and are rotatably mounted on pinion shafts 65. The pinion shafts 65 are here shown as being axially extending shaft members having threaded end portions 65ª engaged in threaded openings of the radial annular flange portion 66 of the carrier 45. The sleeve portion 44 of the carrier 45 has a fixed driving engagement with the output shaft 14 formed by a keyed or splined connection indicated at 67.

The ring gear 62 is here shown as being formed on or carried by an axially extending portion 62ª of the hub member 37 and is thus connected with the first turbine member 23 through the annular wall 38. The sun gear 63 is journalled for rotation on the output shaft 14 and includes an axially extending sleeve portion 68. The mounting hub 49 of the second turbine member 24 is connected in relatively fixed relation with the sun gear 63 by means of a keyed or splined connection therebetween and indicated at 69.

The second turbine member 24 and the sun gear 63 are both rotatable in a forward direction about the axis of the output shaft 14, but are inhibited against reverse rotation by a one-way brake device 70. This brake device comprises outer and inner annular races or rings 71 and 72, and an annular group of rollers 73 disposed between these races. The outer race 71 is suitably secured to the hub member 49 of the second turbine 24, and the inner race 72 is mounted on the inner sleeve 17 and is fixed thereon by a keyed or splined connection indicated at 74.

From the construction of the transmission mechanism 10, as thus far described, it will be seen that the first and second turbine members 23 and 24 are both connected with the output shaft 14 through the planetary gearing 12. When the first turbine member 23 rotates in a forward direction and the sun gear 63 is held against reverse rotation by the one-way brake device 70, the pinions 64 will roll on the sun gear and the first turbine will then drive the output shaft through the carrier 45 at a torque amplification ratio provided by the planetary gearing and which may be a ratio of approximately 1.6 to 1.

When the first and second turbine members 23 and 24 are rotating in a forward direction, but with the second turbine member rotating at a lower speed than the first turbine member, torque will be transmitted to the output shaft 14 from both turbine members through the planetary gearing 12, but the amplification ratio at which the torque is transmitted will be of a lower value than the 1.6 to 1 ratio mentioned above and will decrease progressively as the speed of the second turbine member increases relative to the speed of the first turbine member, or in other words, will decrease as the speed differential between these two turbine members decreases.

Figure 2:
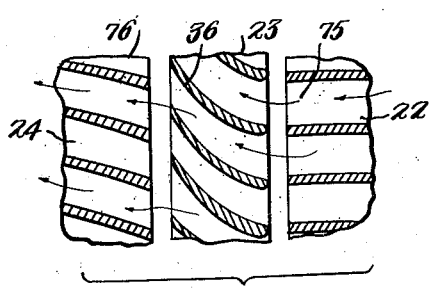
Fig. 2 is a fragmentary and somewhat diagrammatic sectional view taken through the first turbine member and the adjacent portions of the pump member and second turbine member, substantially as indicated by section line 2—2 of Fig. 1, and illustrating the approximate shapes and angularity of the blades of these members.
Figure 3:
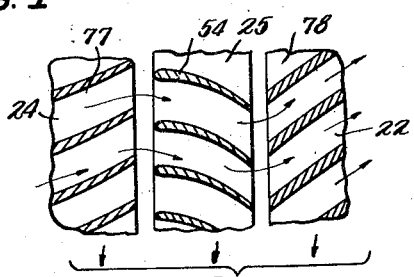
Fig. 3 is a fragmentary sectional view similar to Fig. 2, but taken through the reaction member and adjacent portions of the pump member and second turbine member, substantially as indicated by section line 3—3 of Fig. 1.

The blades of the bladed annular members 22, 23, 24 and 25 can be of any number, space, curvature and shape that may be desired, and Figs. 2 and 3 of the drawings show suitable shapes and curvatures for the blades of these members. Fig. 2 shows the cooperating relation of the blades 36 of the first turbine member 23 with the adjacent discharge portion 75 of the pump member 22 and the adjacent inlet portion 76 of the second turbine member 24. Fig. 3 shows the cooperation of the blades 54 of the reaction member 25 with the adjacent discharge portion 77 of the second turbine member 24 and the adjacent inlet portion 78 of the pump member 22.

As shown in Fig. 1 of the drawings, the bladed annular members 22, 23, 24 and 25 are disposed in a series relation in the toroidal fluid circuit, such that the first turbine member 23 is disposed between the delivery portion 75 of the pump member and the inlet portion 76 of the second turbine member, and will receive and be acted upon directly by the velocity fluid stream delivered by the pump member. The second turbine member 24 is disposed between the first turbine member 23 and the reaction member 25, and receives and is acted upon by the fluid stream after it has passed through the first turbine member. The reaction member 25 is disposed between the discharge portion 77 of the second turbine member 24 and the inlet portion 78 of the pump member 22, such that the fluid stream leaving the second turbine member passes through and acts on this reaction member before being returned to the inlet portion of the pump member.

During the starting or stall condition of operation of the transmission mechanism 10, the forward rotation of the pump member 22 by the input member 13 causes the velocity fluid stream to be propelled around the toroidal circuit passage 26 in the manner indicated above. This fluid stream will be immediately effective on the first turbine member 23 to rotate the same and cause this turbine member to deliver torque to the output shaft 14 at a high torque amplification value provided by the planetary gearing 12.

At this time, that is during the starting or stall condition, the second turbine member 24 and the sun gear 63 are held against reverse rotation by the one-way brake device 70, and the reaction member 25 is also held against reverse rotation by the one-way brake device 55. The design of the reaction member 25, with respect to the number, curvature, length and shape of its blades 54, is such that its reaction effect on the first turbine member 23, during the stall condition of the turbine member 24 explained hereinafter, will produce a further torque amplification at a ratio of approximately 2 to 1. The over-all torque output being supplied to the output shaft 14 by the first turbine member 23 during the starting or stall condition of operation of the transmission 10 will, therefore, be at approximately a 2×1.6=3.2 torque amplification ratio.

Since the second turbine member 24 is held against reverse rotation during this starting or stall condition of operation, it will also function as a reaction member, or will assist the reaction member 25, in producing the reaction function by which the torque output of the first turbine member 23 is further amplified, as just described above.

As the speed of forward rotation of the first turbine member 23 increases, the direction of impingement of the fluid stream against the blades of the second turbine member 24 will cause the latter turbine member to also rotate in a forward direction at progressively increasing speeds. The forward rotation of the second turbine member 24 causes torque to be supplied therefrom to the output shaft 14 through the planetary gearing 12, as previously indicated herein, but as the speed of rotation of the second turbine member approaches the speed of rotation of the first turbine member, the torque amplification value of the planetary gearing 12 decreases progressively, and when the first and second turbine members are rotating at approximately the same speed, the torque amplification ratio of the planetary gearing becomes substantially zero and the planetary gearing is then in a so-called "locked-up" condition.

At this time, torque is being transmitted to the output shaft 14 from the first and second turbine members 23 and 24 simultaneously and the effective transmission ratio is then approximately a 1 to 1 ratio. During this condition of operation, the reaction member 25 is rotating idly in a forward direction at substantially the same speed as the pump and turbine members, as is permitted by the one-way brake device 55.

Figure 4:
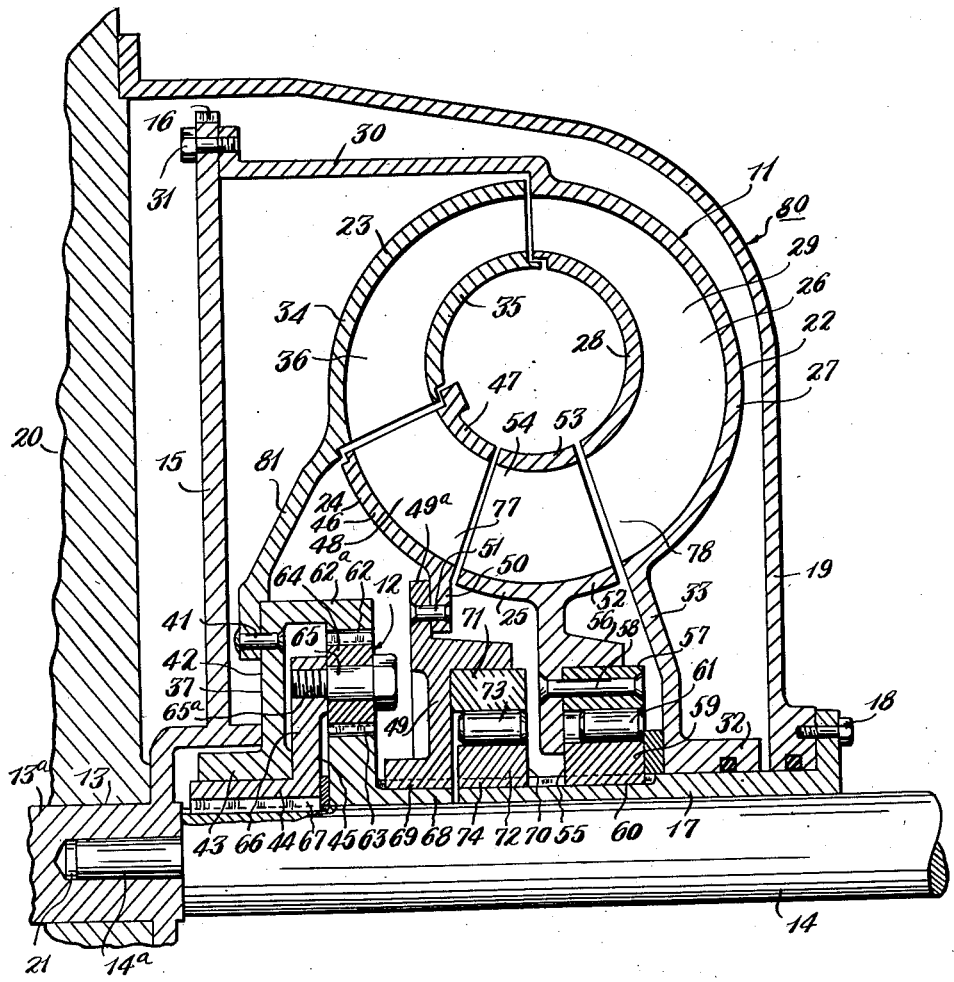
Fig. 4 is another partial vertical axial section similar to Fig. 1, but taken through a modified form of the transmission mechanism.

Fig. 4 of the drawings shows a transmission mechanism 80 which is generally similar to the transmission mechanism 10 and operates in a similar manner, but which is of a somewhat simplified construction and which is capable of developing an exceptionally high torque output during its stall or starting condition of operation. The various parts of the transmission 80 which are the same as or correspond with the various parts of the transmission 10 have been designated by the same reference characters.

In the modified transmission 80, the first turbine member 23 is designed such that its blades and its portion of the toroidal fluid passage 26 are of increased arcuate length, and the blades and circuit passage portion of the second turbine member 24 are of relatively decreased arcuate length. The arcuate lengths of these first and second turbine members are shown in the transmission 80 as being such that the arcuate length of the first turbine member 23 is somewhat longer than that of the second turbine member 24, and the arcuate length of the latter turbine member is approximately the same as the arcuate length of the reaction member 25. The relatively longer arcuate length of the first turbine member 23, as contrasted with the arcuate length of this member in Fig. 1, will provide for the development of a high value of torque with minimum slippage at the stall condition, such as is desirable for starting the movement of a heavy load.

The construction of the modified transmission 80 is simplified with respect to the first turbine member 23 inasmuch as this member is mounted directly on the hub 37 by means of an annular web 81 which is formed as a continuation of the curved outer wall 34 of this turbine member and is secured to the radial flange portion 42 of this hub by the rivets 41. With this simplified construction, the curved annular web 38 of the transmission mechanism 10 can be omitted.

From the accompanying drawings and the foregoing detailed description, it will now be readily understood that this invention provides a transmission mechanism of the hydraulic torque converter type which is very practical, and which is highly suitable for use in motor vehicles and will operate to provide a desired high value of torque amplification during the starting or stall condition of operation, as well as a very satisfactory torque amplification value over a wide range of operating speeds.

Although the improved transmission mechanism of this invention has been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. In a power transmission mechanism of the hydraulic torque converter type; a group of cooperating relatively rotatable bladed annular members defining a toroidal fluid circuit and comprising pump means, first and second turbine members and a reaction member in series relation in said circuit with said reaction member inhibited against reverse rotation; rotatable power input means connected with said pump means; rotatable power output means; a planetary gear train comprising a ring gear connected with said first turbine member, a sun gear connected with said second turbine member and planet pinion gears disposed between and meshing with said ring and sun gears; means inhibiting reverse rotation of said sun gear; and carrier means drivingly connected with said output means and having said planet pinion gears mounted thereon; said carrier means being located on one side of said gear train and radially inward of said ring gear.

2. In a power transmission mechanism of the hydraulic torque converter type; a group of cooperating relatively rotatable bladed annular members defining a toroidal fluid circuit and comprising pump means, first and second turbine members and a reaction member in series relation in said circuit with said reaction member inhibited against reverse rotation; rotatable power input means connected with said pump means; rotatable power output means; a planetary gear train comprising a ring gear connected with said first turbine member, a sun gear inhibited against reverse rotation and planet pinion gears disposed between and meshing with said ring and sun gears; carrier means drivingly connected with said output means and having said planet pinion gears mounted thereon; and means connecting said sun gear with said second turbine member and disposed in radially adjacent telescoping relation to said output means.

3. In a power transmission mechanism of the hydraulic torque converter type; a group of cooperating relatively rotatable bladed annular members defining a toroidal fluid circuit comprising pump means, first and second turbine members and a reaction member in series relation in said circuit with said reaction member inhibited against reverse rotation; rotatable power input means connected with said pump means; rotatable power output means; a planetary gear train comprising a ring gear connected with said first turbine member, a sun gear inhibited against reverse rotation and planet pinion gears disposed between and meshing with said ring and sun gears; means disposed in radially adjacent telescoping relation to said output means and connecting said second turbine member with said sun gear on one side of said gear train; and carrier means drivingly connected with said output means and having said planet pinion gears mounted thereon; said carrier means being located on the other side of said gear train and radially inward of said ring gear.

4. In a power transmission mechanism of the hydraulic torque converter type; a relatively stationary housing defining a transmission chamber; a group of cooperating relatively rotatable bladed annular members in said chamber and defining a toroidal fluid circuit comprising pump means, first and second turbine members and a reaction member in series relation in said circuit with said reaction member inhibited against reverse rotation; rotatable power input means extending into said chamber from one side thereof and connected with said pump means; rotatable power output means substantially coaxially aligned with said input means and extending into and substantially across said chamber from the opposite side thereof; a sleeve connected with said housing and extending into said chamber from said opposite side and being disposed in radially adjacent telescoping relation to said output means; a planetary gear train comprising a ring gear connected with said first turbine member, a sun gear and planet pinion gears disposed between and meshing with said ring and sun gears; said sun gear being inhibited against rotation and being connected with said second turbine member by connecting means located on one side of said gear train; and carrier means drivingly connected with said output means and having said planet pinion gears mounted thereon; said carrier means being located on the other side of said gear train and radially inward of said ring gear; said planetary gear train and said group of bladed annular members being disposed in said chamber in surrounding relation to said output means.

5. In a power transmission mechanism of the hydraulic torque converter type; a group of cooperating relatively rotatable bladed annular members defining a toroidal fluid circuit and comprising pump means, first and second turbine members and a reaction member in series relation in said circuit; rotatable power input means connected with said pump means; rotatable power output means in directly adjacent substantially coaxially aligned relation to said input means; planetary gearing connecting said first turbine member with said output means including a sun gear having said second turbine member connected thereto for rotation therewith; said planetary gearing and said group of bladed annular members being disposed in surrounding relation to said output means; a first brake device for preventing reverse rotation of said reaction member; and a second brake device operable to prevent reverse rotation of said second turbine member and said sun gear, independently of the operation of said first brake device.

6. In a power transmission mechanism of the hydraulic torque converter type; a relatively stationary housing defining a transmission chamber and including a sleeve projecting into said chamber; a group of cooperating relatively rotatable bladed annular members defining a toroidal fluid circuit and comprising pump means, first and second turbine members and a reaction member in series relation in said circuit; rotatable power input means extending into said chamber from one side thereof and connected with said pump means; a rotatable power output shaft extending into and substantially across said chamber from the opposite side thereof and being rotatable in said sleeve with its inner end in directly adjacent substantially coaxially aligned relation to said input means; a ring gear connected with said first turbine member; a rotatable sun gear; planet pinion gears disposed between and connecting said ring and sun gears; carrier means supporting said pinion gears and having direct driving connection with said output shaft; connecting means connecting said sun gear with said second turbine member for rotation therewith; a first brake device for preventing reverse rotation of said reaction member; and a second brake device operable to prevent reverse rotation of said second turbine member and said sun gear, independently of the operation of said first brake device; said group of bladed annular members, said ring gear and said first and second brake devices being disposed in said chamber in surrounding relation to said output shaft.

7. In a power transmission mechanism of the hydraulic torque converter type; a relatively stationary housing defining a transmission chamber and including a sleeve projecting into said chamber; a group of cooperating relatively rotatable bladed annular members defining a toroidal fluid circuit and comprising pump means, first and second turbine members and a reaction member in series relation in said circuit; rotatable power input means extending into said chamber from one side thereof and connected with said pump means; a power output shaft extending into and substantially across said chamber from the opposite side thereof and being rotatable in said sleeve with its inner end in directly adjacent substantially coaxially aligned relation to said input means; planetary gearing forming a torque transmitting connection between said first and second turbine members and said output shaft and comprising ring and sun gears and planet pinion gears disposed between and having meshing engagement with said ring and sun gears; carrier means supporting said pinion gears and located on one side of said gear train and radially inward of said gear ring; said first and second turbine members being direct-connected respectively with said ring and sun gears and said carrier means being direc-connected with said output shaft; a first one-way brake device effective between said sleeve and said reaction member for preventing reverse rotation of the latter; and a second one-way brake device effective between said sleeve and said second turbine member for preventing reverse rotation of said second turbine member and said sun gear, independently of the operation of said first brake device; said planetary gearing, said group of bladed annular members and said first and second one way brake devices being disposed in said chamber in surrounding relation to said output shaft.

8. In a power transmission mechanism of the hydraulic torque converter type; a group of cooperating relatively rotatable bladed annular members defining a toroidal fluid circuit comprising pump means, first and second turbine members and a reaction member in series relation in said circuit; rotatable power input means connected with said pump means; a power output shaft in directly adjacent substantially coaxially aligned relation to said input means; a planetary gear train comprising a ring gear connected with said first turbine member, a sun gear and planet pinion gears disposed between and meshing with said ring and sun gears; connecting means disposed in radially adjacent telescoping relation to said output shaft and connecting said second turbine member with said sun gear and being located on one side of said gear train; carrier means drivingly connected with said output shaft and having said planet pinion gears mounted thereon; said carrier means being located on the other side of said gear train and radially inward of said ring gear; a first one-way brake device for preventing reverse rotation of said reaction member; and a second one-way brake device operable to prevent reverse rotation of said second turbine member and said sun gear, independently of the operation of said first brake device.

9. In a power transmission mechanism of the hydraulic torque converter type; a relatively stationary housing defining a transmission chamber; a group of cooperating relatively rotatable bladed annular members in said chamber and defining a toroidal fluid circuit comprising pump means, first and second turbine members and a reaction member in series relation in said circuit; rotatable power input means extending into said chamber from one side thereof and connected with said pump means; a rotatable power output shaft extending into and substantially across said chamber from the opposite side thereof and in directly adjacent substantially coaxially aligned relation to said input means; a sleeve connected with said housing and extending into said chamber from said opposite side and being disposed in radially adjacent telescoping relation to said output shaft; a planetary gear train comprising a ring gear connected with said first turbine member, a sun gear and planet pinion gears disposed between and meshing with said ring and sun gears; connecting means located on one side of said gear train and connecting said sun gear with said second turbine member for rotation with the latter; carrier means drivingly connected with said output shaft and having said planet pinion gears mounted thereon; said carrier means being located on the other side of said gear train and radially inward of said ring gear; a first one-way brake device effective between said sleeve and said reaction member for preventing reverse rotation of the latter; and a second one-way brake device effective between said sleeve and said connecting means for preventing reverse rotation of said second turbine member and said sun gear, independently of the operation of said first brake device; said planetary gear train, said group of bladed annular members and said first and second one-way brake devices being disposed in said chamber in surrounding relation to said output shaft.

References Cited in the file of this patent

UNITED STATES PATENTS

| | | |
|---|---|---|
| 2,203,177 | Patterson | June 4, 1940 |
| 2,293,358 | Pollard | Aug. 18, 1942 |
| 2,298,648 | Russell | Oct. 13, 1942 |
| 2,312,849 | Pollard | Mar. 2, 1943 |
| 2,325,876 | Pollard | Aug. 3, 1943 |
| 2,578,450 | Pollard | Dec. 11, 1951 |
| 2,602,353 | Keller | July 8, 1952 |
| 2,616,309 | Russell | Nov. 4, 1952 |

FOREIGN PATENTS

| | | |
|---|---|---|
| 666,092 | Great Britain | Feb. 6, 1952 |